United States Patent [19]

L'Homme

[11] 4,139,937

[45] Feb. 20, 1979

[54] APPARATUS FOR APPLYING A TUBULAR INSULATING HOUSING TO AN ELECTRICAL CONNECTOR SECURED TO A WIRE

[75] Inventor: Gérard L'Homme, Courdimanche, France

[73] Assignee: AMP Incorporated, Harrisburg, Pa.

[21] Appl. No.: 787,187

[22] Filed: Apr. 13, 1977

[30] Foreign Application Priority Data

May 14, 1976 [FR] France ............ 76 14669

[51] Int. Cl.[2] ............ H01R 43/00; B23P 19/02

[52] U.S. Cl. ............ 29/754; 29/748; 29/630 A; 29/235; 29/450; 29/453

[58] Field of Search ............ 29/754, 753, 748, 750–752, 29/809, 630 A, 282, 234, 235, 450, 453

[56] References Cited

U.S. PATENT DOCUMENTS

| | | | |
|---|---|---|---|
| 2,930,114 | 3/1960 | Erdmann | 29/809 |
| 3,071,174 | 1/1963 | Kerns | 29/753 |
| 3,264,860 | 8/1966 | Herb | 29/748 |
| 3,329,002 | 7/1967 | Schwalm | 29/753 |
| 3,535,764 | 10/1970 | Hoffman | 29/809 |
| 3,618,192 | 11/1971 | Hoffken | 29/809 |
| 3,734,992 | 5/1973 | Masino et al. | 29/753 |
| 3,857,154 | 12/1974 | Hammond et al. | 29/753 |

*Primary Examiner*—C.W. Lanham
*Assistant Examiner*—Daniel C. Crane
*Attorney, Agent, or Firm*—Allan B. Osborne

[57] ABSTRACT

Apparatus for applying a tubular insulating housing to an electrical connector crimped to a wire comprises a horizontal base at one end of which are disposed a pair of wire gripping jaws, one of which is fixed to the base and the other of which is movable by a plunger vertically towards and away from the base. A support having a channel for receiving an electrical connector crimped to a wire is pivotally mounted on the base immediately rearwardly of the fixed jaw, a slide on the base being movable there along towards and away from the fixed jaw through a mechanism operated by the plunger. The slide has at its forward end a recess opening towards the fixed jaw, for receiving a tubular insulating housing. With the wire gripped between the jaws at a position just back from the connector, and with the connector located in the channel in the connector support, the slide is advanced from a position remote from the fixed jaw, to cause a housing in the recess of the slide to be pushed onto the connector to receive it, as the slide displaces the connector support about its pivot to eject the connector from the connector support whereafter the slide is retracted, the movable jaw is raised and the connector with the housing thereon is removed from the apparatus.

8 Claims, 8 Drawing Figures

APPARATUS FOR APPLYING A TUBULAR INSULATING HOUSING TO AN ELECTRICAL CONNECTOR SECURED TO A WIRE

BACKGROUND OF THE INVENTION

1. The Field of the Invention

The present invention relates to an improved apparatus for applying a tubular insulating housing to an electrical connector secured to a wire.

2. The Prior Art

There is disclosed in U.S. Pat. No. 3,667,102 apparatus for applying a tubular insulating housing to an electrical connector secured to a wire, the apparatus comprising a first support having a recess open at one end and being adapted to receive the housing with its axis extending towards the open end of the recess, a second support having a channel for releasably receiving the connector, and means for relatively moving the first support towards the second support to cause the connector to be inserted into the housing.

In such known apparatus, the connector in the channel of the connector support i.e. the second support is held rigidly against the action of the force needed to insert the connector into the housing, by means which engage a shoulder of the connector. Some electrical connectors, especially those of small size may have no shoulder convenient for this purpose and may in any event be damaged as a result of the insertion force, which may be substantial where the connector is to be retained in the housing by snap action detent means.

Other apparatus for applying tubular insulating members to electrical connectors are described in U.S. Pat. Nos. 2,829,423; 3,025,594; 3,716,913 and 3,734,992; and British patent specification Nos. 1,152,764 and 1,374,849.

SUMMARY OF THE INVENTION

According to one aspect of the invention, apparatus for applying a tubular insulating housing to an electrical connector secured to a wire, comprises a first support having a recess open at one end and being adapted to receive the housing with its axis extending towards the open end of the recess, a second support having a channel for releasably receiving the connector, means for relatively moving the first support towards the second support, and a pair of jaws for gripping the wire at a position back from, but adjacent to, the connector, the channel of the second support being in axial alignment with the wire when the wire has been gripped by the wire gripping jaws and the second support being subsequently displaceable by the first support as it is moved relatively towards the second support to eject the connector from the channel to allow the insertion of the connector into the housing.

According to another aspect of the invention, apparatus for applying a tubular insulating housing to an electrical connector secured to a wire, comprises a horizontal base, a plunger arranged to be driven vertically towards and away from the base, a first wire gripping jaw fixed to the base, a second wire gripping jaw on the plunger and being aligned with the first jaw, an elongate slide which is axially slidable along the base, a housing receiving axial recess formed in the slide and opening towards the first jaw and laterally of the slide, a housing chute for loading housings laterally into the recess, means drivingly connecting the plunger to the slide to move it towards and away from the first jaw and a connector support freely pivotally mounted on the base, between the plunger and the slide, the connector support having a channel for receiving an electrical connector crimped to a wire and being swingable by the slide as it is moved towards the first jaw, out of the path of movement of the slide to permit a connector in the channel to be received into a housing in the recess, with the wire gripped between the jaws at a position adjacent the connector.

It has been found that if the wire is gripped as just described, the connector is held with respect to the housing sufficiently rigidly to withstand the insertion force.

It is one object of the invention to provide improved apparatus of the kind in question, having the advantage of versatility in the matter of the kinds and sizes of connector which can be provided with housings by means of the apparatus.

It is another object of the invention to provide apparatus which may conveniently be manufactured by the simple conversion of a conventional applicator for crimping electrical connectors to wires. This is of particular advantage where there is but a small customer requirement for apparatus for applying housings to connectors so that the production of apparatus especially built for this purpose (as are the known apparatus described above) would not be commercially justifiable.

It is a further object of the invention to provide apparatus in which the channel and the connector can be so dimensioned that the connector fits into the channel of the connector support with such clearance that the operator can readily lay the connector in the channel. In order to ensue that the connector is not displaced from the channel before it is ejected therefrom, a connector hold down member may be provided, this being displaceable by the first support, i.e. the housing support, to allow the ejection of the connector from the channel.

Other objects and advantages of the invention will be apparent from the description below, with reference to the accompanying drawings.

For a better understanding of the invention reference will now be made by way of example to the accompanying drawings in which.

Figure 1:
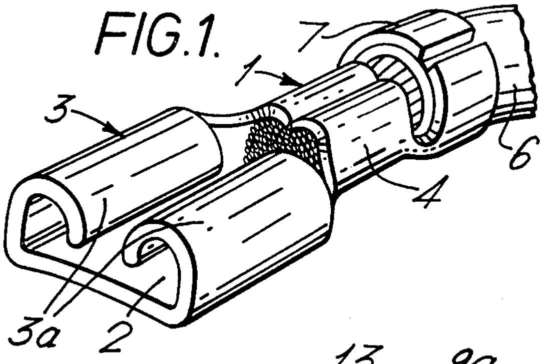
FIG. 1 is an enlarged perspective view of an electrical connector crimped to an insulated electrical lead.

As shown in FIG. 1, an electrical connector, which is generally referenced 1, comprises a substantially flat base 2 from two opposite edges of which extend a pair of inwardly rolled ears 3*a* the free ends of which are directed towards the base 2 to provide in cooperation with the base 2 a receptacle generally referenced 3. A first crimping ferrule 4 crimped about the electrically conductive core of an insulated electrical lead 6 and a second crimping ferrule 7 crimped about the insulation of the lead 6 also extend from the base 2. The receptacle 3 is intended to mate with a flat metal tab (not shown) to be inserted between the free ends of the ears 3*a* and the base 2.

Figure 2:
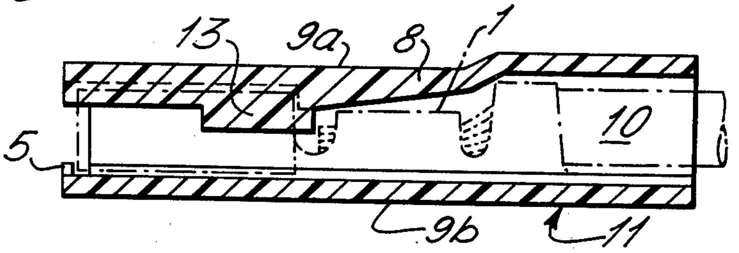
FIG. 2 is an enlarged longitudinal sectional view of an insulating housing for the connector.

As shown in FIG. 2, the housing, which is generally referenced 11, comprises a first pair of walls 9*a* and 9*b* joined by a second pair of walls 10, to form a substantially rectangular section tubular body which is open at both ends. A stop 5 extends inwardly of the housing 11 from one end wall 9*b* and a wedge-shaped detent 8 extends inwardly from the wall 9*a* at a position intermediate the ends of the housing 11. The stop 5 and the detent 8 cooperate to secure the connector 1 in the housing 11 when the connector has been inserted into the housing 11 from the end of the housing remote from the stop 5, with the receptacle 3 leading. The connector is stabilized in the housing by a rib 13 which extends between the ears 3*a* of the receptacle 3. During insertion of a connector into the housing, the wall 9*a* of the housing is cammed upwardly (as seen in FIG. 2) by the engagement of the receptacle 3 with the detent 8, the wall 9*a* subsequently resiling to resume its initial position, when the connector has been fully inserted in the housing, so that the terminal is retained in the housing between the detent 8 and stop 5, as will be apparent from FIG. 2.

Figure 3:
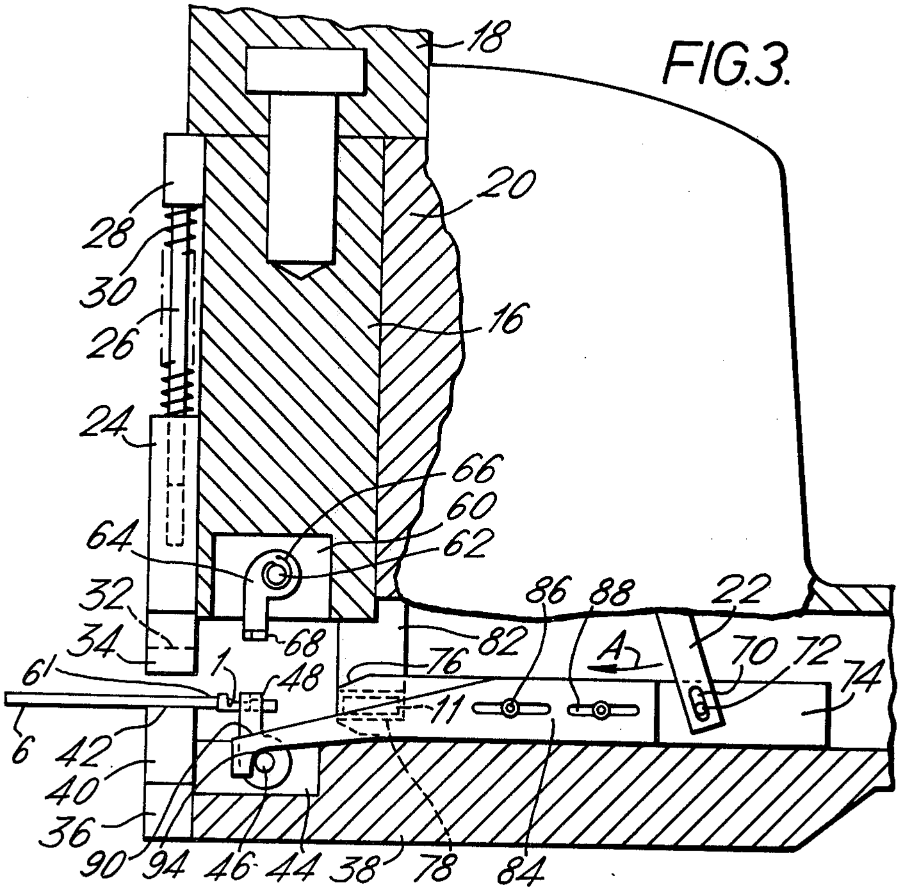
FIG. 3 is a diagrammatic side view, shown partly in section, of apparatus for inserting the connector into the housing, the parts of the apparatus being shown as positioned at the beginning of a cycle of operation of the apparatus.
Figure 4:
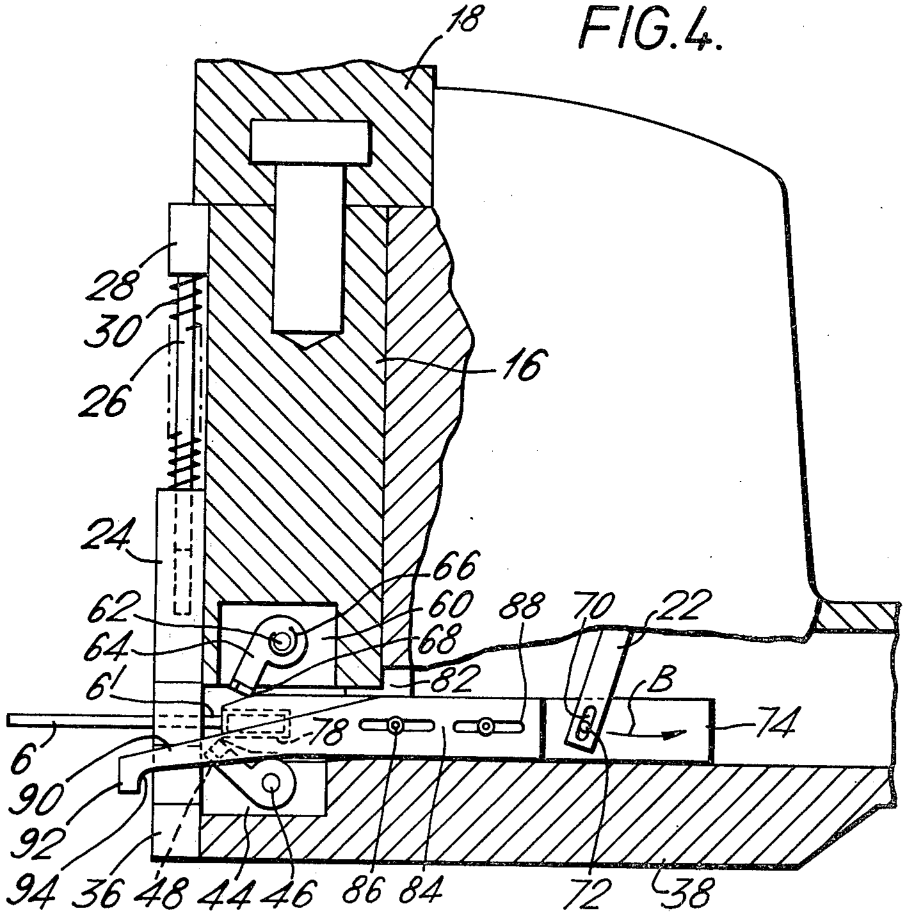
FIG. 4 is a similar view to that of FIG. 3 but showing the parts positioned at a later stage during the cycle of operation of the apparatus.

Apparatus for inserting connectors 1 into housings 11 may readily be provided by modifying a conventional crimping press for applying connectors, for example of the kind shown in FIG. 1, to wires. Such a press comprises as shown in FIGS. 3 and 4 a plunger 16, connected to a press ram 18 (only part of which is shown) arranged to be driven in reciprocating vertical motion by a motor (not shown) through a single-revolution cluth (not shown), so that the ram 18 performs one working stroke and one return stroke, each time an actuating switch (not shown), for example a pedal switch, is operated. The plunger 16 is mounted in guides (not shown) for vertical reciprocating movement under the action of the ram 18. A cam member 20 (only part of which is shown) fixed to the plunger 16, is arranged to drive a feed arm 22 in reciprocating swinging movement as indicated by the arrows A and B in FIGS. 3 and 4, respectively, through a linkage (not shown). In the conventional press mentioned above, this arm is used to drive a feed finger for feeding electrical connectors in strip form to the crimping dies of the press.

Figure 5:
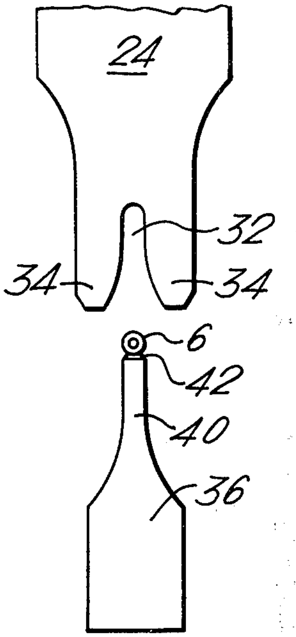
FIG. 5 is an enlarged, fragmentary, front view of part of the apparatus.

In the press described above, as modified for inserting electrical connectors 1 into housings 11, a first wire gripper jaw 24 is slidably mounted on the front, i.e. left hand (as seen in FIGS. 3 and 4) face of the plunger 16, on a rod 26 depending from a mounting block 28 fixed to the plunger block 28 and jaw 24 so that the jaw 24 is movable towards the block 28 against the action of the spring 30. As best seen in FIG. 5, the jaw 24 has a recess 32 defined by depending legs 34.

Beneath the jaw 24, a second jaw 36 is fixed to the front face of a base plate 38 of the press and comprises, as best seen in FIG. 5, a reduced cross-section blade-like portion 40 dimensioned for reception in the recess 32 and having a wire supporting surface 42, which is preferably serrated for wire gripping purposes.

Figure 7:
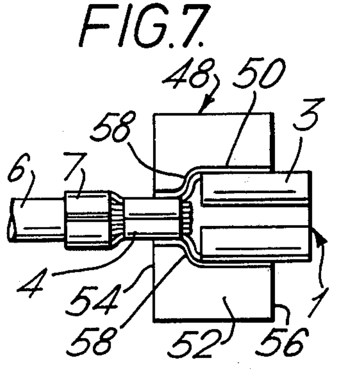
FIG. 7 is an enlarged, diagrammatic, plan view of a detail of the apparatus as shown in FIG. 3.
Figure 8:
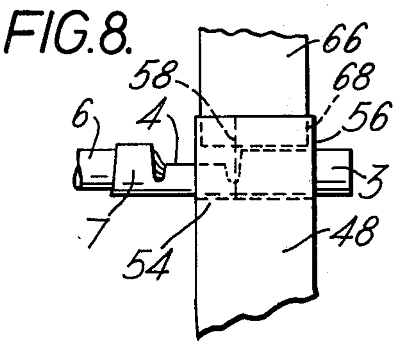
FIG. 8 is an enlarged, diagrammatic, fragmentary, side view showing details of the apparatus at a position during the cycle of operation of the apparatus, intermediate the positions of FIGS. 3 and 4.

A recess 44 formed in base plate 38 has pivotally mounted therein a rotatable shaft 46, to which a connector support 48 is secured. As best seen in FIG. 7, the support 48 has therein a channel 50 opening into a free end face 52 of the support 48 and also opening into its forward and rear faces 54 and 56, respectively. The recess 50 which is dimensioned to receive the connector 1 has a rear portion for receiving the receptacle 3 and a narrower forward portion for receiving the crimping ferrule 4, the rear portion defining opposed shoulders 58 for abutment by the receptacle 3 to prevent its being withdrawn from the channel 50 in the downward (as seen in FIG. 7) direction. The plunger 16 has at its lower (as seen in FIGS. 3 and 4) end a recess 60 in which is mounted on a pivot 62 a connector hold down member 64, which is displaceable in an anti-clockwise (as seen in FIGS. 3 and 4) sense about the pivot 62, against the action of a return spring 66. The member 64 has a free end portion 68 which as shown in FIG. 8 is receivable in the channel 50 of the support 48 to hold down a connector 1 in the channel 50.

Figure 6:
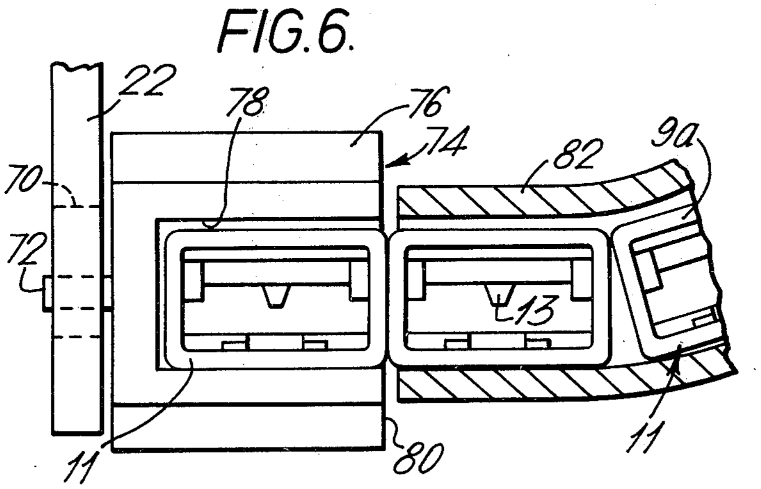
FIG. 6 is an enlarged, fragmentary, diagrammatic front view, shown partly in section, of a detail of the apparatus as shown in FIG. 3.

The arm 22 has a slot 70 receiving with clearance a pin 72 projecting from a housing support and feed slide 74 slidable back and forth along the base plate 38 under the action of the arm 22. The slide 74 has a chamfered forward end 76 having a lateral recess 78 which opens forwardly and also opens as best seen in FIG. 6, into the side 80 of the slide 74 opposite to that from which the pin 72 projects. The recess 78 is dimensioned to receive a housing 11 from a chute 82 down which a row of housings 11 are fed from a source, for example a vibratory feed hopper, of these housings. A connector support return arm 84 is secured to the same side of the slide 74, as the pin 72, by means of fasteners 86 projecting through slots 88 in the arm 84, so that the arm 84 can be fixed in a desired position of adjustment longitudinally of the slide 74. The arm 84 has a forward portion 90 projecting beyond the chamfered end 76 of the slide 74 and having a hooked end 92 presenting an arcuate inner surface 94 for drivingly engaging the shaft 46.

In operation with the parts of the apparatus positioned as shown in FIG. 3, the operator grasps a wire 6 to which a connector 1 has previously been crimped, inserts the connector 1 between the jaws 24 and 36 and lays the receptacle 3 of the connector in the channel 50 of the support 48 from above, with the crimping ferrules 4 and 7 of the connector projecting through the forward end of the channel 50 and with the wire 6 positioned on the surface 42 of the portion 40 of jaw 36. In this initial position of the parts a housing 11 has been received in the recess 78 of the slide 74 from the chute 8, with the end of the housing through which the connector is to be inserted, facing forwardly i.e., in the direction of the terminal 1 in the support 48.

The operator now actuates the ram 18 by means of the switch so that the ram 18 is driven through a working stroke by the motor to drive the plunger 16 downwardly (as seen in FIGS. 3 and 4) towards the base plate 38. During the working the working stroke of the ram 18, the arm 22 is driven in a clockwise sense of rotation by the cam 20 i.e. in the direction of the arrow A in FIG. 3, so that the slide 74 is advanced towards the support 48.

Also as the plunger 16 descends, the portion 40 of the jaw 76 is received in the recess 32 of the jaw 24 so that the wire 6 is gripped between the surface 42 and the arcuate base of the recess 32 and the portion 68 of the hold down member 64 is received in the channel 50 of the support 48 to retain the connector 1 therein as shown in FIG. 8. As the slide 74 is further advanced, the connector 1, thus held, enters the housing 11 in the recess 78 of the slide 74 and the chamfered end 76 of the slide 74 forces the support 48 and hold down member 64 apart, as shown in FIG. 4, to allow the terminal 1 to be fully received in the housing 11 in the recess 78. Since the wire 6 is firmly gripped between the jaws 24 and 36 and the length 6' of wire between these jaws and the connector 1 is relatively short, the wire length 6' serves to support the connector 1 axially, against the force exerted there against by the advancing housing 11.

As the ram 18 carries out its return stroke, the wire 6 is released allowing the operator to withdraw the housing 11, now firmly secured to the terminal 1 from the recess 78, between the open jaws 24 and 36. Also as the plunger 16 rises, the slide 74 is returned to its FIG. 3 position and the arcuate inner surface 94 of the arm 84 engages the shaft 46 of the support 48 so as to rotate it back to its initial position at the end of the return stroke of the slide 74. The connector hold down member 64 is returned to its FIG. 3 angular position by the return spring 66.

An advantage of the apparatus described above is that it can be produced by simple conversion of a conventional press for crimping electrical connectors to wires. Another advantage of the apparatus is that since the wire is gripped by the jaws 24 and 36, at a position sufficiently close to the connector for the connector to be held firmly against the force required for fully and lockably inserting the connector into the housing, and since the support 48 is easily displaced by the slide 74 the connector is not driven against the support 48 with sufficient force to damage the connector. Also, the connector is held firmly in position in the support 48, by virtue of the wire being gripped by the jaws, even if the connector does not have well defined shoulders for abutment against the shoulder 58 of the support 48, as may frequently be the case with smaller sized connectors.

I claim:

1. Apparatus for applying a tubular insulating housing to an electrical connector secured to a wire, the apparatus comprising a first support having a recess open at one end and being adapted to receive the housing with its axis extending towards the open end of the recess, a second support having a channel for releasably receiving the connector, means for relatively moving the first support towards the second support, and a pair of jaws for gripping the wire at a position back from, but adjacent to the connector, the channel of the second support being in axial alignment with the wire when the wire has been gripped by the wire gripping jaws, the first support having an associated abutment surface, the second support being displacably mounted in the path of movement of the first support and in alignment with said abutment surface, whereby the second support is engaged by such abutment surface as the first support is moved relatively toward the second support thereby to displace the second support away from the first support to eject the connector from the channel to allow the insertion of the connector into the housing.

2. Apparatus according to claim 1, in which the first support has an initial position remote from the wire gripping means, in which position the recess of the first support communicates with a chute along which a housing is fed into the recess of the first support through a lateral opening in the first support.

3. Apparatus for applying a tubular insulating housing to an electrical connector secured to a wire, the apparatus comprising a horizontal base, a press ram arranged to be driven vertically towards and away from the base, a first wire gripping jaw fixed to the base, a second wire gripping jaw on the press ram and being aligned with the first jaw, an elongated slide which is axially slidable along the base, a housing receiving axial recess formed in the slide and opening toward the first jaw and laterally into the recess, means drivingly connecting the press ram to the slide to move it towards and away from the first jaw and a connector support freely pivotally mounted on the base, between the press ram and the slide and in the path of movement of the slide, the slide having an abutment surface proximate to that part of the recess which opens towards the first jaw, the connector support having a channel for receiving an electrical connector crimped to a wire and being in alignment with said abutment surface whereby the connector support is engaged by the abutment surface as the slide is moved towards the first jaw thereby to swing the connector support out of the path of movement of the slide to cause a connector in the the channel to be received into a housing in the recess, with the wire gripped between the jaws at a position adjacent to the connector.

4. Apparatus for applying a tubular insulating housing to an electrical connector secured to a wire, the apparatus comprising a first support in the form of an elongated slide having a chamfered end with an open recess therein, said recess being adapted to receive the housing with its axis extending toward the open end of the recess, a second support having a channel for releasably receiving the connector, a movable connector hold down member adapted to removably retain the connector in the channel, a pair of jaws for gripping the wire at a position back from, but adjacent to, the connector, the channel of the second support being in axial alignment with the wire when the wire has been gripped by the wire gripping jaws and the second support and the hold down member being subsequently displaceable by the chamfered end of the first support as it moves along a rectilinear path towards said wire gripping means so as to eject the connector from the channel to allow the insertion of the connector into the housing.

5. Apparatus according to claim 4, in which the slide carries an arm adapted drivingly to engage a pivot shaft of the second support to return it to its initial position subsequently to the displacement of the second support by the slide.

6. Apparatus according to claim 4, in which the wire gripping means comprise a first jaw mounted on a plunger which is movable transversely of the path of relative movement of the supports, and a second jaw which is fixed, the first jaw being urged in the direction of the second jaw by a spring against the action of which the plunger is movable towards the slide, after the first jaw has engaged the second jaw.

7. Apparatus according to claim 6, in which the first jaw has a recess receiving a portion of the second jaw, such portion having a serrated wire supporting surface cooperating with the base of the recess to grip the wire.

8. Apparatus according to claim 6, in which the first support is driven towards and away from the wire gripping means by means of an arm operated by the plunger.

* * * * *